US011269080B2

(12) United States Patent
Lee et al.

(10) Patent No.: US 11,269,080 B2
(45) Date of Patent: Mar. 8, 2022

(54) TRACKING METHOD, ELECTRONIC DEVICE USING THE SAME, AND TRACKING SYSTEM USING THE SAME

(71) Applicant: Chicony Electronics Co., Ltd., New Taipei (TW)

(72) Inventors: Yen-Ching Lee, New Taipei (TW); Chi-Yang Chiu, New Taipei (TW); Chien-Tsung Chen, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 340 days.

(21) Appl. No.: 16/672,758

(22) Filed: Nov. 4, 2019

(65) Prior Publication Data

US 2020/0393570 A1 Dec. 17, 2020

(30) Foreign Application Priority Data

Jun. 14, 2019 (TW) ................. 108120796

(51) Int. Cl.
*G01S 19/24* (2010.01)
*G01S 19/42* (2010.01)
(52) U.S. Cl.
CPC .............. *G01S 19/24* (2013.01); *G01S 19/42* (2013.01); *G01S 2205/002* (2013.01)
(58) Field of Classification Search
CPC ........... G01S 19/24; G01S 19/42; H01Q 3/04; H01Q 3/08

USPC .................................................... 342/357.63
See application file for complete search history.

(56) References Cited

U.S. PATENT DOCUMENTS 10,024,975 B2 * 7/2018 Dougan ................ G01S 19/215

FOREIGN PATENT DOCUMENTS

CN 104375135 A 2/2015
JP 2007074561 A * 3/2007

\* cited by examiner

*Primary Examiner* — Harry K Liu
(74) *Attorney, Agent, or Firm* — Muncy, Geissler, Olds & Lowe, P.C.

(57) ABSTRACT

A tracking method, an electronic device using the same, and a tracking system using the same are provided. The electronic device includes a wireless communication unit, an azimuth detection unit, a storage unit, and a processing unit. The wireless communication unit detects an external wireless communication signal to generate a current RSSI. The azimuth detection unit detects a current azimuth of the electronic device. The storage unit stores pattern strength indicators and a previous azimuth. The processing unit obtains an RSSI adjustment value according to the current azimuth, the previous azimuth, and the pattern strength indicators, and the processing unit further obtains an RSSI corrected value according to the RSSI adjustment value and the current RSSI.

20 Claims, 7 Drawing Sheets

T ↓

| θ \ φ | 0 | 15 | 30 | 45 | 150 | 165 | 180 |
|---|---|---|---|---|---|---|---|
| | Response (dB) | Response (dB) | Response (dB) | Response (dB) | Response (dB) | Response (dB) | Response (dB) |
| 0 | -14.34 | -6.03 | -11.28 | -4.34 | -11.66 | -12.09 | -18.17 |
| 15 | -15.4 | -7.39 | -8.22 | -5.25 | -5.72 | -10.26 | -14.88 |
| 30 | -16.46 | -10.23 | -8.38 | -4.96 | -3.58 | -7.09 | -11.59 |
| 45 | -11.68 | -13.09 | -7.42 | -2.59 | -4.52 | -4.69 | -8.16 |
| 60 | -6.9 | -10.95 | -8.65 | -6.59 | -7.98 | -3.77 | -4.74 |
| 75 | -5.44 | -9.18 | -10.17 | -11.84 | -11.75 | -4.19 | -3.67 |
| 90 | -3.98 | -7.92 | -9.82 | -11.27 | -14.85 | -5.52 | -2.61 |
| 105 | -3.9 | -7.06 | -6.63 | -8.14 | -15.23 | -7.2 | -2.83 |
| 120 | -3.82 | -6.68 | -3.45 | -6.67 | -7.33 | -8.93 | -3.06 |
| 135 | -5.08 | -7.57 | -3.54 | -9.19 | -4.56 | -11.3 | -4.74 |
| 150 | -6.33 | -8.75 | -4.2 | -7.92 | -3.44 | -9.91 | -6.43 |
| 165 | -10.34 | -10.31 | -4.19 | -5.01 | -2.97 | -7.29 | -12.3 |
| 180 | -14.34 | -11.08 | -3.75 | -3.31 | -2.35 | -5.03 | -18.17 |
| 195 | -15.4 | -10.48 | -4.56 | -3.47 | -0.92 | -3.48 | -14.88 |
| 210 | -16.46 | -8.76 | -4.31 | -4.6 | -0.09 | -2.06 | -11.59 |
| 225 | -11.68 | -7.58 | -3.89 | -4.74 | 0.36 | -1.18 | -8.16 |
| 240 | -6.9 | -6.12 | -3.64 | -4.91 | 0.25 | -0.88 | -4.74 |
| 255 | -5.44 | -4.37 | -3.31 | -5.18 | -0.22 | -1.14 | -3.67 |
| 270 | -3.98 | -3.03 | -2.69 | -4.85 | -0.82 | -1.84 | -2.61 |
| 285 | -3.9 | -2.4 | -2.7 | -4.49 | -1.69 | -2.99 | -2.83 |
| 300 | -3.82 | -2.2 | -2.79 | -4.32 | -2.83 | -4.98 | -3.06 |
| 315 | -5.08 | -1.89 | -3.45 | -0.53 | -5.43 | -8.59 | -4.74 |
| 330 | -6.33 | -2.25 | -3.87 | -0.75 | -6.92 | -18.73 | -6.43 |
| 345 | -10.34 | -4.14 | -7.58 | -2.54 | -9.29 | -15.41 | -12.3 |

FIG.4

TRACKING METHOD, ELECTRONIC DEVICE USING THE SAME, AND TRACKING SYSTEM USING THE SAME

CROSS-REFERENCE TO RELATED APPLICATION

This non-provisional application claims priority under 35 U.S.C. § 119(a) to Patent Application No. 108120796 in Taiwan, R.O.C. on Jun. 14, 2019, the entire contents of which are hereby incorporated by reference.

BACKGROUND

Technical Field

The instant disclosure relates to a positioning technology, in particular, to a tracking method, an electronic device using the same, and a tracking system using the same in which an azimuth detection unit is utilized.

Related Art

Currently, the positioning systems are widely utilized in daily lives, for example, shopping mall guidance, long-term care tracking, and warehousing surveillance. One of the most well-known positioning systems is the global positioning system (GPS). However, the GPS system is expensive. Moreover, the positioning of the GPS may be affected by the weather or by the shielding of buildings and fails to provide a positioning function or provides an improper positioning result.

SUMMARY

In recent decades, along with the advancement of the wireless sensing technologies, a positioning technology using received signal strength indication (RSSI) known to the inventor(s) has been developed. As compared with the GPS technology, the RSSI-based positioning technology takes less cost. However, the signals emitted by a device using the technology have different strengths at different directions, causing errors in the position detection or distance detection.

In view of this, in one embodiment, an electronic device is provided. The electronic device comprises a wireless communication unit, an azimuth detection unit, a storage unit, and a processing unit. The wireless communication unit detects an external wireless communication signal to generate a current RSSI. The azimuth detection unit detects a current azimuth of the electronic device. The storage unit stores a plurality of pattern strength indicators and a previous azimuth. The pattern strength indicators are received signal strength indicators measured from the wireless communication unit rotated at a plurality of different azimuths. The previous azimuth is an azimuth of the electronic device detected by the azimuth detection unit at a previous timing. The processing unit is coupled to the wireless communication unit, the storage unit, and the azimuth detection unit. The processing unit obtains an RSSI adjustment value according to the current azimuth, the previous azimuth, and the pattern strength indicators. The processing unit further obtains an RSSI corrected value according to the RSSI adjustment value and the current RSSI.

In one embodiment, a tracking system is provided. The tracking system comprises a movable device and a tracking device. The movable device comprises a first wireless communication unit, a storage unit, an azimuth detection unit, and a first processing unit. The first wireless communication unit detects an external wireless communication signal to generate a current RSSI. The azimuth detection unit detects a current azimuth of the movable device. The storage unit stores a plurality of pattern strength indicators and a previous azimuth. The pattern strength indicators are received signal strength indicators measured from the first wireless communication unit rotated at a plurality of different azimuths. The previous azimuth is an azimuth of the movable device detected by the azimuth detection unit at a previous timing. The first processing unit is coupled to the wireless communication unit, the storage unit, and the azimuth detection unit. The first processing unit obtains an RSSI adjustment value according to the current azimuth, the previous azimuth, and the pattern strength indicators. The first processing unit further obtains an RSSI corrected value according to the RSSI adjustment value and the current RSSI. The first processing unit controls the first wireless communication unit to output the RSSI correction value. The tracking device comprises a second wireless communication unit and a second processing unit. The second wireless communication unit is in a communication connection with the first wireless communication unit to receive the RSSI correction value. The second processing unit is coupled to the second wireless communication unit. The second processing unit obtains relative position information of the movable device according to the RSSI correction value.

In one embodiment, a tracking method is provided. The tracking method comprises detecting an external wireless communication signal to generate a current RSSI by a wireless communication unit and detecting a current azimuth by an azimuth detection unit; obtaining an RSSI adjustment value according to the current azimuth, a previous azimuth, and a plurality of pattern strength indicators by a processing unit, wherein the pattern strength indicators are received signal strength indicators measured from the wireless communication unit rotated at a plurality of different azimuths, and the previous azimuth is an azimuth detected by the azimuth detection unit at a previous timing; and obtaining an RSSI corrected value according to the RSSI adjustment value and the current RSSI by the processing unit.

As above, according to one or some embodiments of the instant disclosure, the azimuth detection unit detects the azimuths at different timings recurrently, and the RSSI adjustment value can be obtained according to the current azimuth, the previous azimuth, and the pattern strength indicators at different azimuths from the wireless communication unit. Moreover, the current RSSI can be corrected according to the RSSI adjustment value, so that the misjudgment in calculating the relative position or the relative distance can be prevented.

BRIEF DESCRIPTION OF THE DRAWINGS

The disclosure will become more fully understood from the detailed description given herein below for illustration only, and thus not limitative of the disclosure, wherein:

FIG. 4 illustrates a schematic view of the comparison table of the tracking system of the exemplary embodiment;

DETAILED DESCRIPTION

Figure 1:
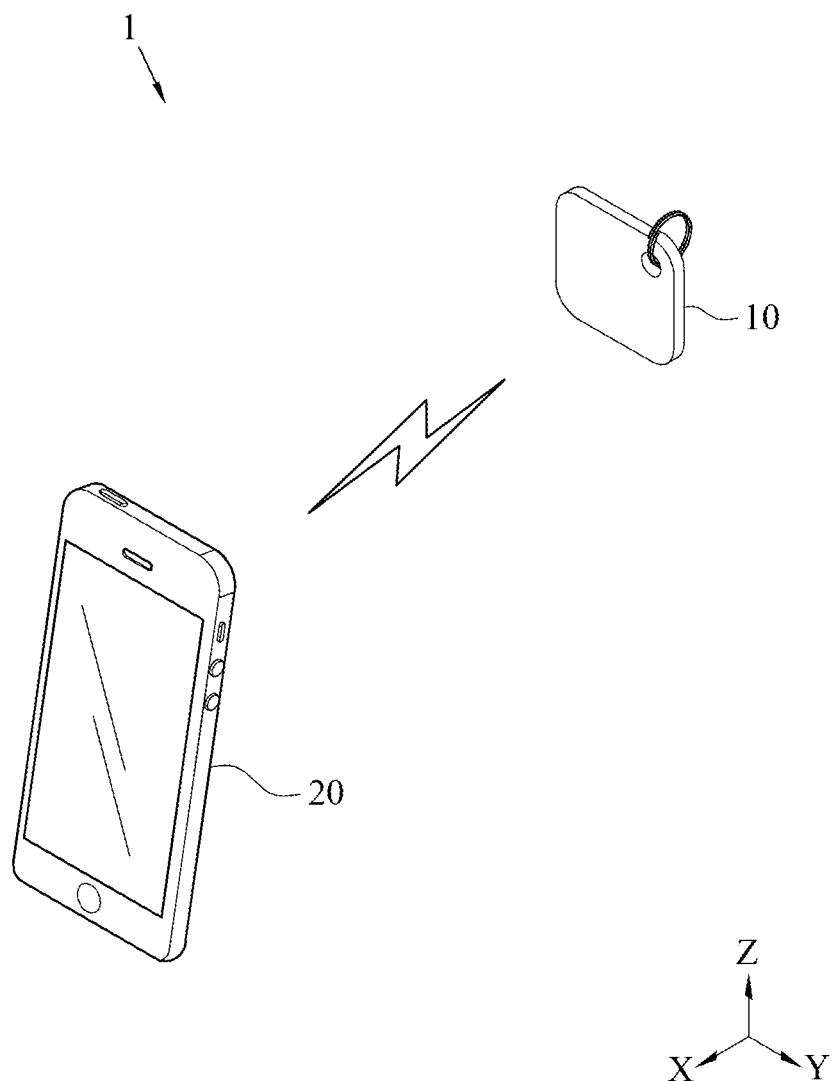
FIG. 1 illustrates a perspective view of a tracking system according to an exemplary embodiment of the instant disclosure.
Figure 2:
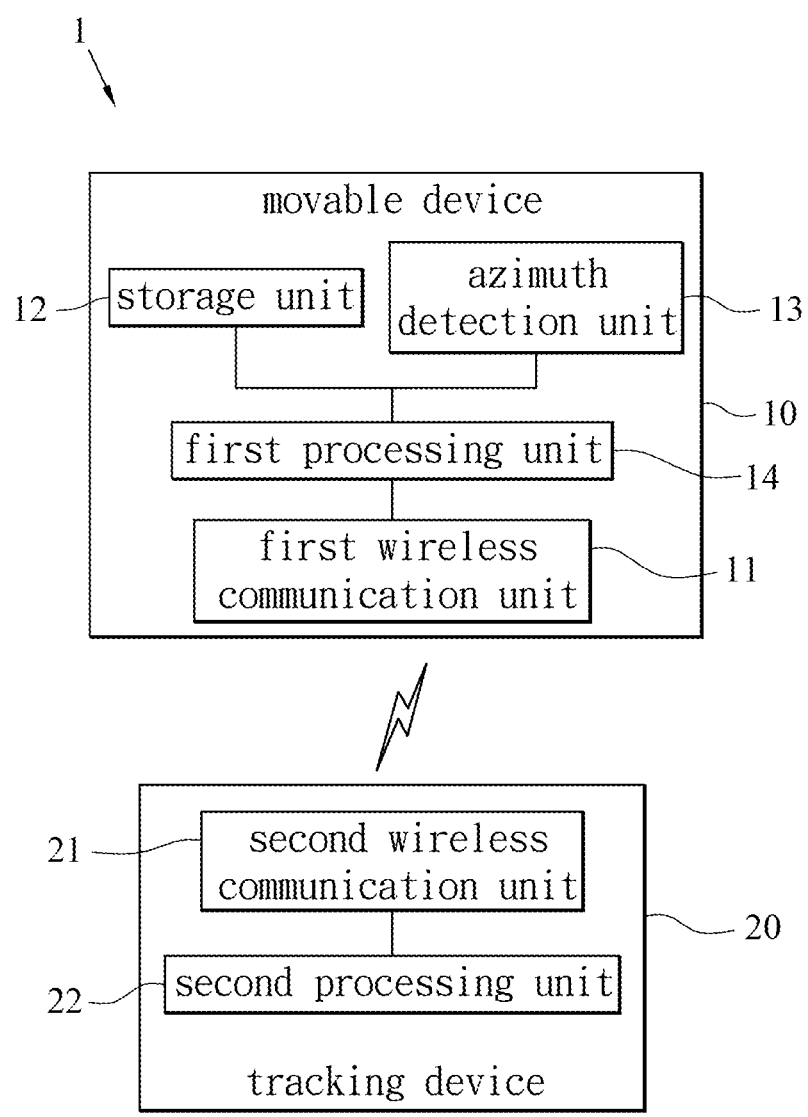
FIG. 2 illustrates a block diagram of the tracking system of the exemplary embodiment.

As shown in FIGS. 1 and 2, in this embodiment, the tracking system 1 comprises a movable device 10 and a tracking device 20. The tracking device 20 can track and position the movable device 10 according to the signal or information emitted by the movable device 10, thereby obtaining the relative position or the relative distance of the movable device 10 with respect to the tracking device 20.

As shown in FIGS. 1 and 2, the movable device 10 comprises a first wireless communication unit 11, a storage unit 12, an azimuth detection unit 13, and a first processing unit 14. In some embodiments, the movable device 10 may be a portable electronic device, e.g., an electronic watch, an electronic bracelet, a smart phone, a tablet computer, or other portable positioning device with electronic components. Alternatively, the movable device 10 may be an electronic or electric device with self-moving ability, for example, a self-propelled vehicle or other self-propelled machines. In a further option, the movable device 10 may be a manhandled electronic or electric device, for example, a drone or a car. As shown in FIG. 1, in this embodiment, a portable positioning device with electronic components is provided as an example for the movable device 10, and the user can carry the movable device 10, for example, the user can put the movable device 10 in the pocket, in the backpack, or the user can take the movable device 10 as a key ring. Alternatively, the user can attach the movable device 10 on goods, packages, or other articles.

As shown in FIGS. 1 and 2, the first wireless communication unit 11 of the movable device 10 is adapted to transmit signals or information wirelessly. In some embodiments, the first wireless communication unit 11 may be a WIFI unit, a 3G/4G unit, a radiofrequency unit, a Bluetooth low energy (BLE) unit, or other wireless communication unit supporting Low-Power Wide-Area Network (LPWAN) technology. The first wireless communication unit 11 may be combined with an antenna or may have a built-in antenna to emit or receive wireless signals or information.

As shown in FIGS. 1 and 2, the azimuth detection unit 13 of the movable device 10 is adapted to detect the azimuth of the movable device 10 recurrently. In some embodiments, the azimuth detection unit 13 may be a g-sensor (accelerometer).

As shown in FIGS. 1 and 2, the storage unit 12 of the movable device 10 at least stores a plurality of pattern strength indicators of the first wireless communication unit 11 and the azimuths continuously detected by the azimuth detection unit 13. In some embodiments, the storage unit 12 may be a volatile memory or a non-volatile memory.

Figure 3:
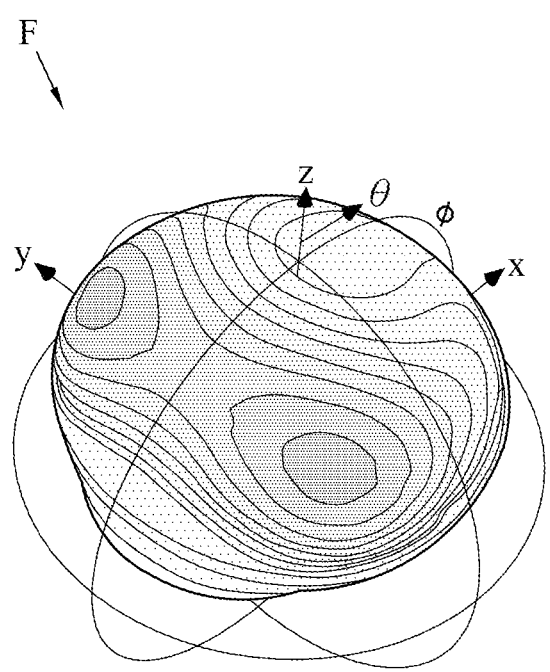
FIG. 3 illustrates a schematic view of the pattern intensity of the tracking system of the exemplary embodiment.

The pattern strength indicators are received signal strength indicators (RSSI) measured from the first wireless communication unit 11 when the first wireless communication unit 11 is rotated at a plurality of different azimuths. For example, as shown in FIG. 3, after the first wireless communication unit 11 is produced, the RSSI of the first wireless communication unit 11 can be measured by a pattern measurement equipment. During the measurement, the first wireless communication unit 11 is rotated at different azimuths in the pattern measurement equipment. For example, the first wireless communication unit 11 is rotated along the horizontal axis (e.g., the X axis or the Y axis shown in FIG. 3) and along the vertical axis (e.g., the Z axis shown in FIG. 3). In other words, in this embodiment, each azimuth includes an included angle φ with respect to the horizontal axis and an included angle θ with respect to the vertical axis. The pattern measurement equipment measures the RSSI of the first wireless communication unit 11 at different azimuths to obtain the pattern strength indicators.

As shown in FIG. 3, in some embodiments, after the pattern measurement equipment measures the pattern strength indicators, an antenna pattern graph F may be generated. In this embodiment, the antenna pattern graph F is of a spherical shape and indicates the strength distribution of the RSSI of the first wireless communication unit 11 at different azimuths. Moreover, in one embodiment, the first wireless communication unit 11 may be assembled on the movable device 10, so that the movable device 10 with the first wireless communication unit 11 is rotated at different azimuths in the pattern measurement equipment during the measurement, but embodiments are not limited thereto. In some embodiments, the first wireless communication unit 11 may be rotated in the pattern measurement equipment alone during the measurement.

Furthermore, the different azimuths of the first wireless communication unit 11 are rotated to and the pattern strength indicators corresponding to the different azimuths are stored in the storage unit 12 of the movable device 10. As a spisific example, in one embodiment, the different azimuths and the pattern strength indicators may be stored in the storage unit 12 in the form of tables. As shown in FIGS. 2 and 4, the storage unit 12 of the movable device 10 stores a two-dimensional comparison table T, and the two-dimensional comparison table T has a plurality of columns A and a plurality of rows S respectively corresponding to the different azimuths. For example, in this embodiment, the contents of the columns A indicate the included angles φ with respect to the horizontal axis of the different azimuths, and the contents of the columns A are arranged from left to right in the order of from zero degree to 180 degrees, with an angle difference between adjacent two columns A being 15 degrees. In addition, the contents of the rows S indicate the included angles θ with respect to the vertical axis of the different azimuths, and the contents of the rows S are arranged from top to bottom in the order of from zero degree to 345 degrees, with an angle difference between adjacent two rows S being 15 degrees. However, embodiments are not limited thereto. According to different product demands or the measurement result of the first wireless communication unit 11, the angle difference between two adjacent columns A and the angle difference between two adjacent rows S may be adjustable.

As shown in FIG. 4, the pattern strength indicators measured from the first wireless communication unit 11 are stored in the two-dimensional comparison table T and respectively correspond to the different azimuths at the columns A and rows S. In other words, in this embodiment, the first wireless communication unit 11 has one corresponding pattern strength indicator at each of the azimuths. For example, in this embodiment, the pattern strength indicator corresponding to the azimuth having the column A of 15 degrees and the row S of 15 degrees is −7.39 dB, the pattern strength indicator corresponding to the azimuth having the column A of 45 degrees and the row S of 30 degrees is −4.96 dB, and so on.

As shown in FIGS. 1 and 2, the first processing unit 14 of the movable device 10 is coupled to the first wireless communication unit 11, the storage unit 12, and the azimuth detection unit 13, for controlling and coordinating the operations of the units, data computation and logical determination, or combinations of the foregoing functions. In some embodiments, the first processing unit 14 may be a central processing unit (CPU), a micro processing unit (MCU), a digital signal processor (DSP), a programmable controller, a chip, an application-specific integrated circuit (ASIC), or the like.

As shown in FIGS. 1 and 2, the tracking device 20 comprises a second wireless communication unit 21 and a second processing unit 22. The second processing unit 22 is coupled to the second wireless communication unit 21. In some embodiments, the tracking device 20 may be an electronic device, for example a smart phone (as shown in FIG. 1), a personal computer, an industrial personal computer (IPC), a surveillance device. In some embodiments, the second processing unit 22 may be a central processing unit (CPU), a micro processing unit (MCU), a digital signal processor (DSP), a programmable controller, a chip, an application-specific integrated circuit (ASIC), or the like.

As shown in FIGS. 1 and 2, the second wireless communication unit 21 of the tracking device 20 is in a communication connection with the first wireless communication unit 11 of the movable device 10, so that signals or information can be transmitted wirelessly between the first wireless communication unit 11 and the second wireless communication unit 21. In some embodiments, the second wireless communication unit 21 may be a WIFI unit, a 3G/4G unit, a radiofrequency unit, a Bluetooth low energy (BLE) unit, or other wireless communication unit supporting Low-Power Wide-Area Network (LPWAN) technology. Moreover, the second wireless communication unit 21 may be combined with an antenna or may have a built-in antenna to emit or receive wireless signals or information.

Figure 6:
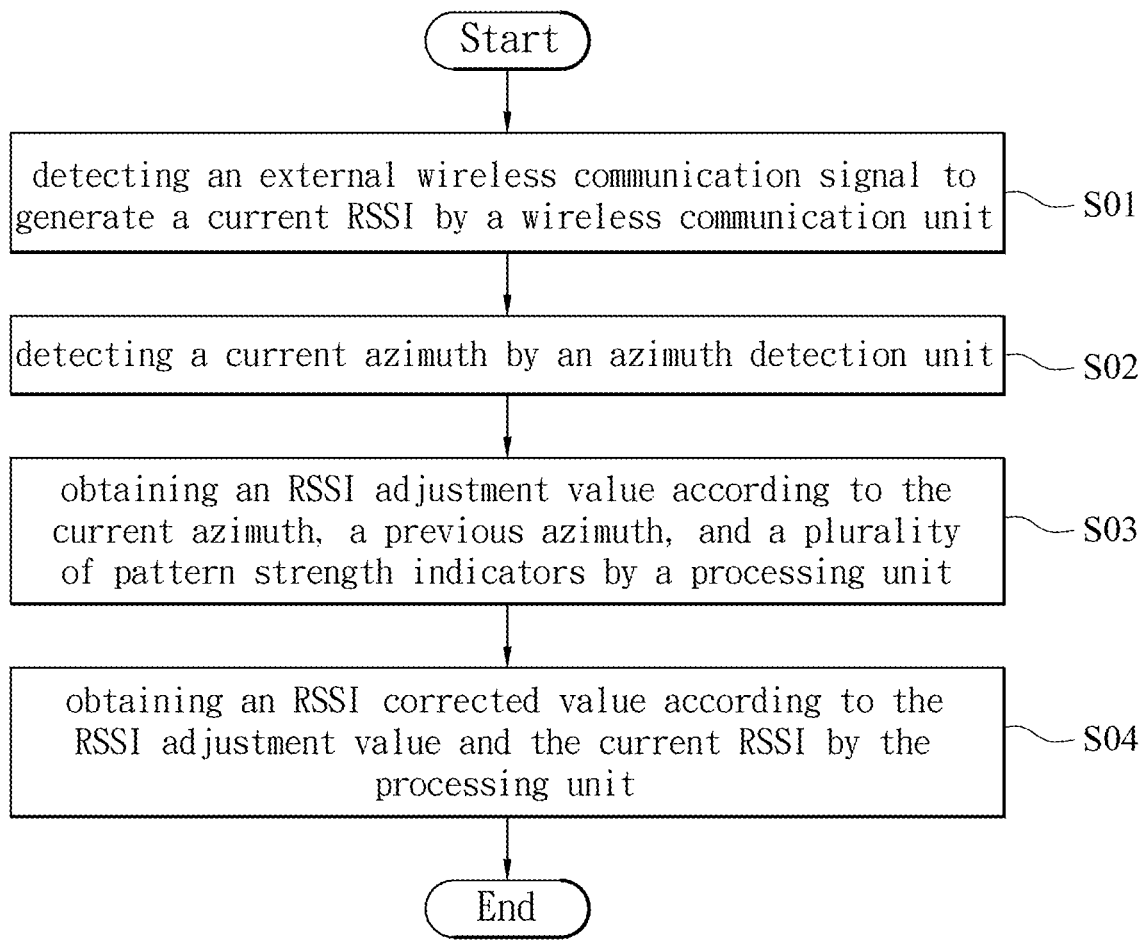
FIG. 6 illustrates a flowchart of a tracking method according to an exemplary embodiment of the instant disclosure.

According to one or some embodiments of the instant disclosure, the purpose of the tracking system 1 is to prevent position or distance misjudgment caused by the change of RSSI when the direction of the movable device 10 is changed. For the sake of understanding the operation of the tracking system 1, an example with detail explanations is provided. As shown in FIG. 6, a flowchart of a tracking method according to an exemplary embodiment of the instant disclosure. In this embodiment, the tracking method comprises step S01 to S04, and the tracking method may be, but not limited to, applied by using the hardware structures described in the embodiment(s) shown in FIGS. 1 and 2.

As shown in FIG. 6, in the step S01, an external wireless communication signal is detected to generate a current RSSI by a wireless communication unit. With reference to FIGS. 1 and 2, in some embodiments, the first wireless communication unit 11 of the movable device 10 can receive the external wireless communication signal. For example, the tracking device 20 may transmit wireless communication signal(s) to the first wireless communication unit 11 continuously, so that the first wireless communication unit 11 can continuously detect the wireless communication signal transmited by the tracking device 20 to generate the RSSI. The current RSSI is the RSSI of the external wireless communication signal detected by the first wireless communication unit 11 at a current timing. For example, the current RSSI may be in a range from −55 dB to −70 dB.

As shown in FIG. 6 in the step S02, a current azimuth is detected by the azimuth detection unit. With reference to FIGS. 1 and 2, in some embodiments, the azimuth detection unit 13 of the movable device 10 can continuously detect the azimuth of the movable device 10. The current azimuth is the azimuth of the movable device 10 detected by the azimuth detection unit 13 at a current timing. In some embodiments, the azimuth detection unit 13 may detect the azimuth of the movable device 10 at a predefined time intervals (like 1 second, 2 seconds, or 5 seconds). Moreover, it is understood that the order of the step S01 and the step S02 may be exchanged or the steps S01 and S02 may be performed simultaneously, embodiments are not limited thereto.

As shown in FIG. 6, after the steps S01 and S02, the step S03 is performed, and in the step S03, the RSSI adjustment value is obtained by the processing unit according to the current azimuth, the previous azimuth, and the pattern strength indicators. With reference to FIG. 2, as mentioned above, the pattern strength indicators measured from the first wireless communication unit 11 at different azimuths are stored in the storage unit 12 of the movable device 10 (for example, in the two-dimensional comparison table T shown in FIG. 4). The previous azimuth is an azimuth of the movable device 10 detected by the azimuth detection unit 13 at a previous timing. For example, the azimuth detection unit 13 detects the azimuth of the movable device 10 at per 5 seconds time interval, the previous azimuth is the azimuth of the movable device 10 detected by the azimuth detection unit 13 5 seconds before the current timing. The azimuths at every timing (for example, the previous azimuth and the current azimuth) detected by the azimuth detection unit 13 are stored in the storage unit 12. The first processing unit 14 of the movable device 10 can read the storage unit 12 to obtain the current azimuth, the previous azimuth, and the pattern strength indicators so as to obtain the RSSI adjustment value. Moreover, when the first processing unit 14 of the movable device 10 is to obtain the RSSI adjustment value at a next timing, the current azimuth stored in the storage unit 12 becomes the previous azimuth with respect to the azimuth obtained at the next timing, so that the RSSI adjustment value corresponding to the next timing can be obtained.

Moreover, in general, the RSSI detected by the first wireless communication unit 11 is responsive to the distance between the movable device 10 and the tracking device 20. In other words, when the RSSI has a larger value (stronger strength), the distance between the movable device 10 and the tracking device 20 is shorter; conversely, when the RSSI has a smaller value (weaker strength), the distance between the movable device 10 and the tracking device 20 is longer. However, with reference to FIGS. 1, 4, and 5, when the movable device 10 is rotated at a different azimuth and faces a different direction (for example, as the arrow L shown in FIG. 5, the movable device 10 is rotated in the same place), the RSSI detected by the first wireless communication unit 11 will be changed even though no distance change between the movable device 10 and the tracking device 20 is occurred. As a result, position or distance misjudgment caused by the change of RSSI may be occurred easily. Hence, the RSSI adjustment value is obtained to compensate the change of the RSSI caused by the rotation of the movable device 10 to prevent the above-mentioned misjudgment conditions. The way to obtain the RSSI adjustment value is described as below with embodiments.

Figure 5:
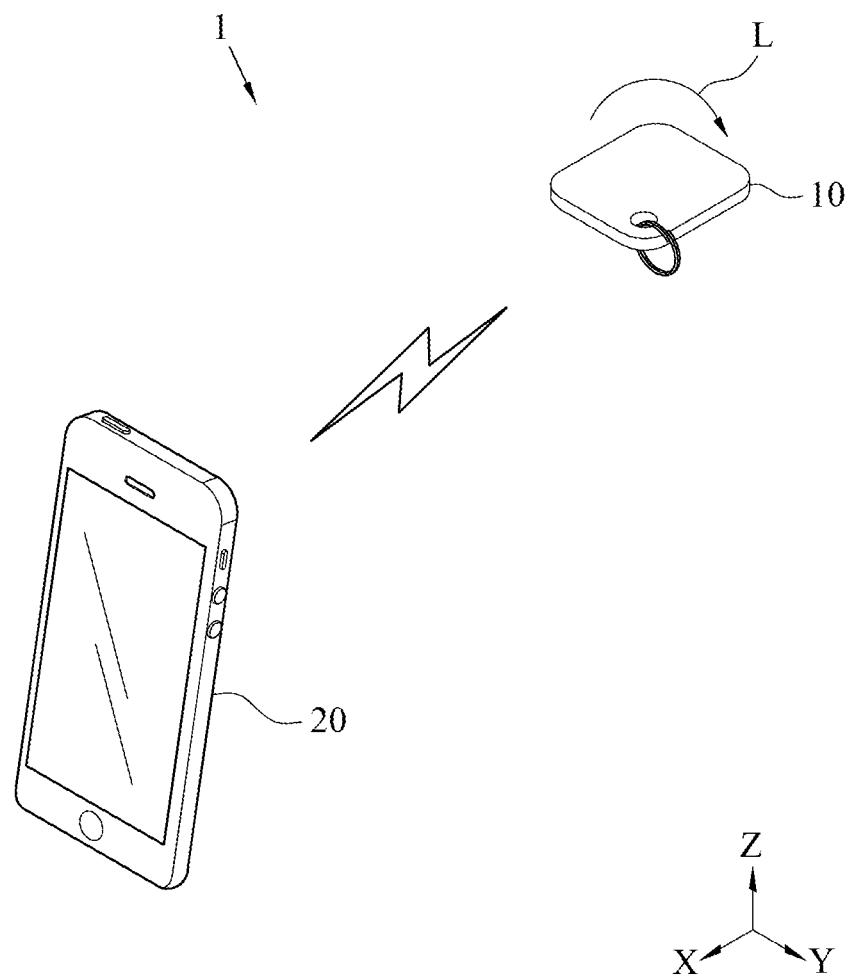
FIG. 5 illustrates a perspective view of a movable device of the tracking system of the exemplary embodiment where the movable device is rotated.

In some embodiments, when the first wireless communication unit 11 of the movable device 10 is linked to the second wireless communication unit 21 of the tracking device 20 to build a communication connection therebetween, the azimuth of the movable device 10 detected by the azimuth detection unit 13 may be taken as an initial azimuth (the initial azimuth may be the previous azimuth mentioned above), and the azimuth of the movable device 10 detected by the azimuth detection unit 13 at a subsequent timing (e.g., the current azimuth mentioned above) is a relative angle of the initial azimuth. For example, as shown in FIG. 4, the initial azimuth may correspond to the azimuth in the two-dimensional comparison table T having the column A of 0 degree and the row S of 0 degree. With reference to FIGS. 1 and 5, if the movable device 10 is rotated along the horizontal axis (for example, the X axis or the Y axis shown in FIG. 5), along the vertical axis (for example, the Z axis shown in FIG. 5), or along both the horizontal axis and the vertical axis in the subsequent timing, for instance, when the movable device 10 is rotated along the horizontal axis by 15 degrees and rotated along the vertical axis by 15 degrees at the subsequent timing, the azimuth of the movable device 10 detected by the azimuth detection unit 13 at the subsequent timing corresponds to the azimuth in the two-dimensional comparison table T having the column A of 15 degrees and the row S of 15 degrees and corresponds to one of the pattern strength indicators (in this embodiment, −7.39 dB).

In some embodiments, the pattern strength indicators stored in the two-dimensional comparison table T comprise the current pattern strength indicator corresponding to the current azimuth and the previous pattern strength indicator corresponding to the previous azimuth, and the first processing unit 14 of the movable device 10 calculates a difference between the current pattern strength indicator and the previous pattern strength indicator to obtain the RSSI adjustment value. For example, the azimuth detection unit 13 detects that the previous azimuth of the movable device 10 at the previous timing corresponds to the azimuth in the two-dimensional comparison table T having the column A of 30 degrees and the row S of 30 degrees so as to correspond to one of the pattern strength indicators in the two-dimensional comparison table T (in this embodiment, −8.38 dB, namely the previous pattern strength indicator). The azimuth detection unit 13 detects that the current azimuth of the movable device 10 at the current timing corresponds to the azimuth in the two-dimensional comparison table T having the column A of 45 degrees and the row S of 45 degrees so as to correspond to another one of the pattern strength indicators in the two-dimensional comparison table T (in this embodiment, −2.59 dB, namely the current pattern strength indicator). The first processing unit 14 of the movable device 10 can check the two-dimensional comparison table T, the previous azimuth and the current azimuth to obtain the previous pattern strength indicator and the current pattern strength indicator. Furthermore, the first processing unit 14 calculates the difference between the previous pattern strength indicator and the current pattern strength indicator (in this embodiment, −8.38 dB−(−2.59 dB)=−5.79 dB) as the RSSI adjustment value. However, embodiments are not limited thereto. In some embodiments, after the difference between the previous pattern strength indicator and the current pattern strength indicator is calculated by the first processing unit 14, the first processing unit 14 can adjust the difference value again to obtain the RSSI adjustment value (for example, the first processing unit 14 may multiply the difference value by a weighting to obtain the RSSI adjustment value).

In some embodiments, the azimuth of the rotated movable device 10 does not correspond to the azimuth stored in the columns A and rows S of the two-dimensional comparison table T, for example, the movable device 10 is rotated along the horizontal axis by 14 degrees and along the vertical axis by 13 degrees. Under this condition, the first processing unit 14 of the movable device 10 may obtain the RSSI adjustment value using interpolation or rounding calculation to the actual value of the azimuth.

As shown in FIG. 6, in the step S04, the processing unit obtains an RSSI corrected value according to the RSSI adjustment value and the current RSSI. With reference to FIG. 2, in some embodiments, the first processing unit 14 of the movable device 10 can calculate a summation of the current RSSI and the RSSI adjustment value to obtain the RSSI correction value, so that the movable device 10 can be tracked and positioned using the RSSI correction value. For example, as shown in FIG. 1, when the movable device 10 and the tracking device 20 are linked with each other, supposed that the previous RSSI detected by the first wireless communication unit 11 of the movable device 10 is −65 dB; as shown in FIG. 5, when the movable device 10 is rotated at the same place to allow the current RSSI detected by the first wireless communication unit 11 of the movable device 10 to change to −60 dB, the RSSI adjustment value obtained by the first processing unit 14 of the movable device 10 according to the current azimuth, the previous azimuth, and the pattern strength indicators is −5 dB or close to −5 dB. Then, the first processing unit 14 adds the current RSSI on the RSSI adjustment value to obtain the RSSI correction value, so that the RSSI corrected value is equal to or close to the previous RSSI. Hence, when the movable device 10 is tracked and positioned using the RSSI correction value, it can be determined that the movable device 10 is at the same position.

According to one or some embodiments of the instant disclosure, since the azimuth detection unit 13 detects the azimuth of the movable device continuously, the rotation direction of the movable device 10 can be obtained by comparing the previous azimuth and the current azimuth. The first wireless communication unit 11 can obtain the previous pattern strength indicator and the current pattern strength indicator from the pattern strength indicators corresponding to different azimuths, and the RSSI adjustment value can be calculated to compensate the change of the current RSSI caused by rotation the movable device 10 to prevent the misjudgment in calculating the relative position or the relative distance between the movable device 10 and the tracking device 20.

In some embodiments, the first processing unit 14 of the movable device 10 can obtain the relative position information (e.g., the relative position or the relative distance) with respect to the tracking device 20 according to the RSSI correction value. For example, the first processing unit 14 calculates the relative distance (namely, the relative position information) between the movable device 10 and the tracking device 20 according to a formula of $$\text{RSSI corrected value} = 10n \log_{10} d + A,$$

wherein n is the path loss exponent, d is the relative distance between the movable device 10 and the tracking device 20, and A is the RSSI with the distance between the movable device 10 and the tracking device 20 being one meter.

Moreover, when the relative position information is greater than a threshold value (for example, when the relative distance between the movable device 10 and the tracking device 20 exceeds 2 meters), the first processing unit 14 can generate an alert signal to trigger an alerting device (not shown) to generate texts, sounds, lights, or vibrations. In some embodiments, the alerting device may be a display, a lamp, a speaker, or the combination of at least two of the foregoing. Moreover, the alerting device may be installed in the movable device 10, the tracking device 20, or be installed in other devices, embodiments are not limited thereto.

Figure 7:
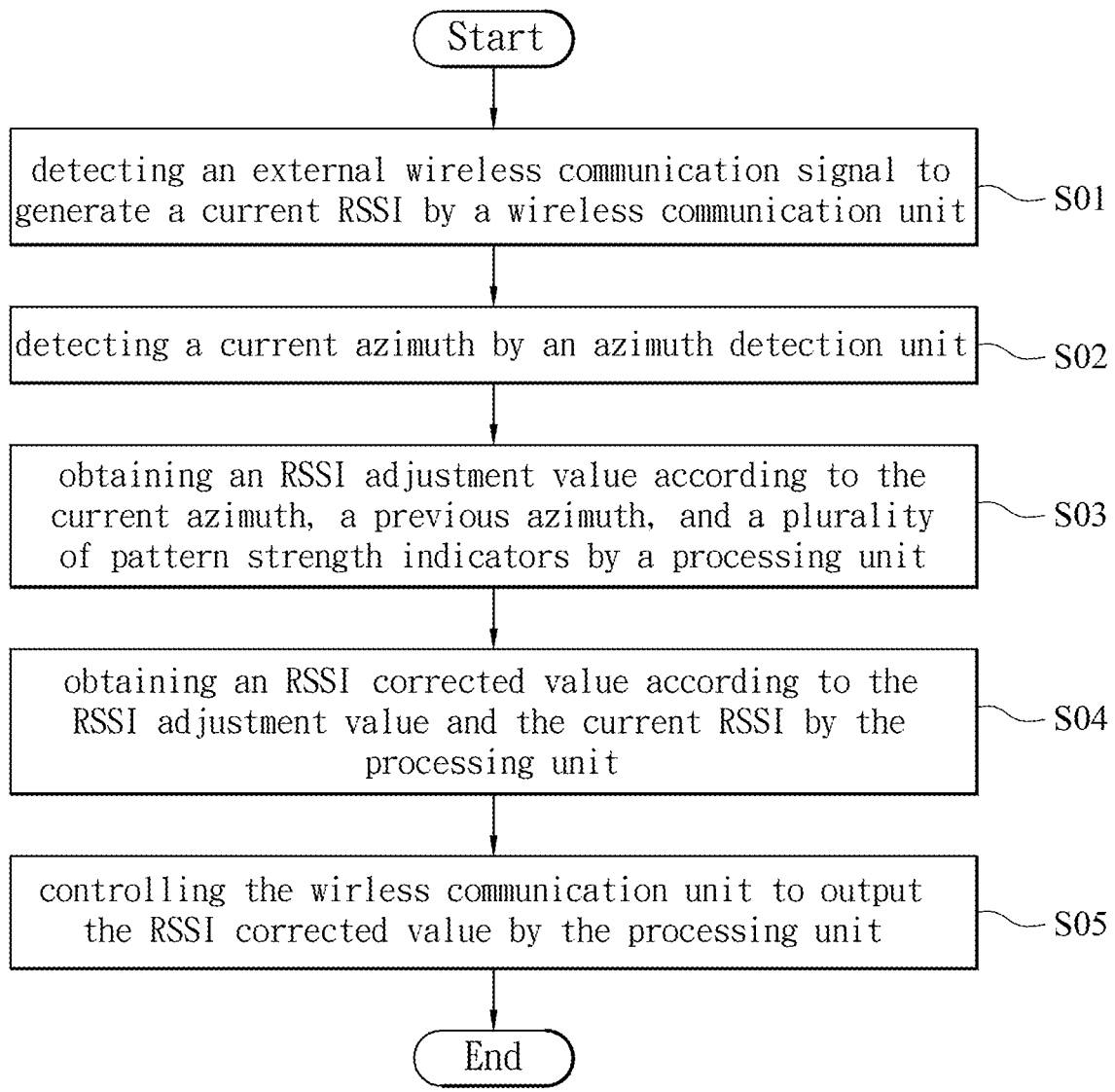
FIG. 7 illustrates a flowchart of a tracking method according to another exemplary embodiment of the instant disclosure.

In some embodiments, as shown in FIG. 7, the step S05 may be performed after the step S04. In the step S05, the processing unit controls the wireless communication unit to output the RSSI correction value. As shown in FIG. 2, after the first processing unit 14 of the movable device 10 performs the calculation to obtain the RSSI correction value, the first processing unit 14 may control the first wireless communication unit 11 to output the RSSI corrected value to the second wireless communication unit 21 of the tracking device 20, so that the second processing unit 22 of the tracking device 20 can obtain the relative position information of the movable device 10 with respect to the tracking device 20 according to the RSSI correction value. When the relative position information is greater than a threshold value, the second processing unit 22 can generate an alert signal to trigger the foregoing alerting device to generate texts, sounds, lights, or vibrations. Alternatively, in some embodiments, the second processing unit 22 of the tracking device 20 can control the second wireless communication unit 21 to output relative position information to the first wireless communication unit 11, so that the first processing unit 14 of the movable device 10 can determine if the relative position information is greater than a threshold value to decide whether to output the alert signal.

In some embodiments, the steps S03 and S04 may be executed by the tracking device 20. As shown in FIG. 2, the current RSSI detected by the first wireless communication unit 11 of the movable device 10, the azimuths of the movable device 10 detected by the azimuth detection unit 13 at different timings, as well as the pattern strength indicators and azimuths stored in the storage unit 12 may be transmitted through the first wireless communication unit 11 to the second wireless communication unit 21 of the tracking device 20, so that the RSSI adjustment value can be obtained according to the current azimuth, the previous azimuth, and the pattern strength indicators by the second processing unit 22 of the tracking device 20 (for example, the step S03 shown in FIG. 6), and the RSSI corrected value can be obtained according to the RSSI adjustment value and the current RSSI by the second processing unit 22 (for example, the step S04 shown in FIG. 6). Hence, the computing burden of the movable device 10 can be greatly reduced.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A tracking system comprising:
 a movable device comprising a first wireless communication unit, a storage unit, an azimuth detection unit, and a first processing unit, wherein the first wireless communication unit detects an external wireless communication signal to generate a current RSSI, the azimuth detection unit detects a current azimuth of the movable device, and the storage unit stores a plurality of pattern strength indicators and a previous azimuth; wherein the pattern strength indicators are received signal strength indicators measured from the first wireless communication unit rotated at a plurality of different azimuths, and the previous azimuth is an azimuth of the movable device detected by the azimuth detection unit at a previous timing; wherein the first processing unit is coupled to the first wireless communication unit, the storage unit, and the azimuth detection unit, the first processing unit obtains an RSSI adjustment value according to the current azimuth, the previous azimuth, and the pattern strength indicators, the first processing unit obtains an RSSI corrected value according to the RSSI adjustment value and the current RSSI, and the first processing unit controls the first wireless communication unit to output the RSSI correction value; and
 a tracking device comprising a second wireless communication unit and a second processing unit, wherein the second wireless communication unit is in a communication connection with the first wireless communication unit to receive the RSSI correction value; the second processing unit is coupled to the second wireless communication unit, and the second processing unit obtains relative position information of the movable device according to the RSSI correction value.

2. The tracking system according to claim 1, wherein the pattern strength indicators comprise a current pattern strength indicator corresponding to the current azimuth and a previous pattern strength indicator corresponding to the previous azimuth, wherein the first processing unit calculates a difference between the current pattern strength indicator and the previous pattern strength indicator to obtain the RSSI adjustment value.

3. The tracking system according to claim 1, wherein the second processing unit further generates an alert signal when the second processing unit determines that the relative position information is greater than a threshold value.

4. The tracking system according to claim 1, wherein the second processing unit further controls the second wireless communication unit to output the relative position information to the first wireless communication unit, the first processing unit further generates an alert signal when the first processing unit determines that the relative position information is greater than a threshold value.

5. The tracking system according to claim 1, wherein the storage unit stores a two-dimensional comparison table having a plurality of columns and a plurality of rows aligned according to the different azimuths, the pattern strength indicators are stored in the two-dimensional comparison table and respectively correspond to the different azimuths at the columns and the rows.

6. An electronic device comprising:
 a wireless communication unit detecting an external wireless communication signal to generate a current RSSI;
 an azimuth detection unit detecting a current azimuth of the electronic device;
 a storage unit storing a plurality of pattern strength indicators and a previous azimuth, wherein the pattern strength indicators are received signal strength indicators measured from the wireless communication unit rotated at a plurality of different azimuths, and the previous azimuth is an azimuth of the electronic device detected by the azimuth detection unit at a previous timing; and
 a processing unit coupled to the wireless communication unit, the storage unit, and the azimuth detection unit, wherein the processing unit obtains an RSSI adjustment value according to the current azimuth, the previous azimuth, and the pattern strength indicators, the processing unit further obtains an RSSI corrected value according to the RSSI adjustment value and the current RSSI.

7. The electronic device according to claim 6, wherein the pattern strength indicators comprise a current pattern strength indicator corresponding to the current azimuth and a previous pattern strength indicator corresponding to the previous azimuth, wherein the processing unit calculates a difference between the current pattern strength indicator and the previous pattern strength indicator to obtain the RSSI adjustment value.

8. The electronic device according to claim 7, wherein the processing unit calculates a summation of the current RSSI and the RSSI adjustment value to obtain the RSSI correction value.

9. The electronic device according to claim 6, wherein the processing unit further controls the wireless communication unit to output the RSSI correction value.

10. The electronic device according to claim 6, wherein the processing unit further obtains relative position information according to the RSSI correction value.

11. The electronic device according to claim 10, wherein the processing unit further generates an alert signal when the processing unit determines that the relative position information is greater than a threshold value.

12. The electronic device according to claim 10, wherein the processing unit further controls the wireless communication unit to output the relative position information.

13. The electronic device according to claim 6, wherein the storage unit stores a two-dimensional comparison table having a plurality of columns and a plurality of rows aligned according to the different azimuths, the pattern strength indicators are stored in the two-dimensional comparison table and respectively correspond to the different azimuths at the columns and the row.

14. A tracking method comprising:
(a) detecting an external wireless communication signal to generate a current RSSI by a wireless communication unit and detecting a current azimuth by an azimuth detection unit;
(b) obtaining an RSSI adjustment value according to the current azimuth, a previous azimuth, and a plurality of pattern strength indicators by a processing unit, wherein the pattern strength indicators are received signal strength indicators measured from the wireless communication unit rotated at a plurality of different azimuths, and the previous azimuth is an azimuth detected by the azimuth detection unit at a previous timing; and
(c) obtaining an RSSI corrected value according to the RSSI adjustment value and the current RSSI by the processing unit.

15. The tracking method according to claim 14, wherein after the step (c) further comprises: controlling the wireless communication unit to output the RSSI corrected value by the processing unit.

16. The tracking method according to claim 14, wherein in the step (b), the pattern strength indicators comprise a current pattern strength indicator corresponding to the current azimuth and a previous pattern strength indicator corresponding to the previous azimuth, and wherein the processing unit calculates a difference between the current pattern strength indicator and the previous pattern strength indicator to obtain the RSSI adjustment value.

17. The tracking method according to claim 16, wherein in the step (c), the processing unit calculates a summation of the current RSSI and the RSSI adjustment value to obtain the RSSI correction value.

18. The tracking method according to claim 14, wherein in the step (b), the pattern strength indicators are stored in a storage unit, the storage unit stores a two-dimensional comparison table having a plurality of columns and a plurality of rows aligned according to the different azimuths, the pattern strength indicators are stored in the two-dimensional comparison table and respectively correspond to the different azimuths at the columns and the rows.

19. The tracking method according to claim 14, wherein the step (b), the previous azimuth is stored in a storage unit, and the processing unit reads the storage unit to obtain the previous azimuth.

20. The tracking method according to claim 14, wherein after the step (a) further comprises: storing the current azimuth in a storage unit.

* * * * *